I. L. SHOEMAKER.
MACHINE FOR GRINDING GLASS STOPPERS.
APPLICATION FILED APR. 22, 1918.
1,298,261.  Patented Mar. 25, 1919.
3 SHEETS—SHEET 3.
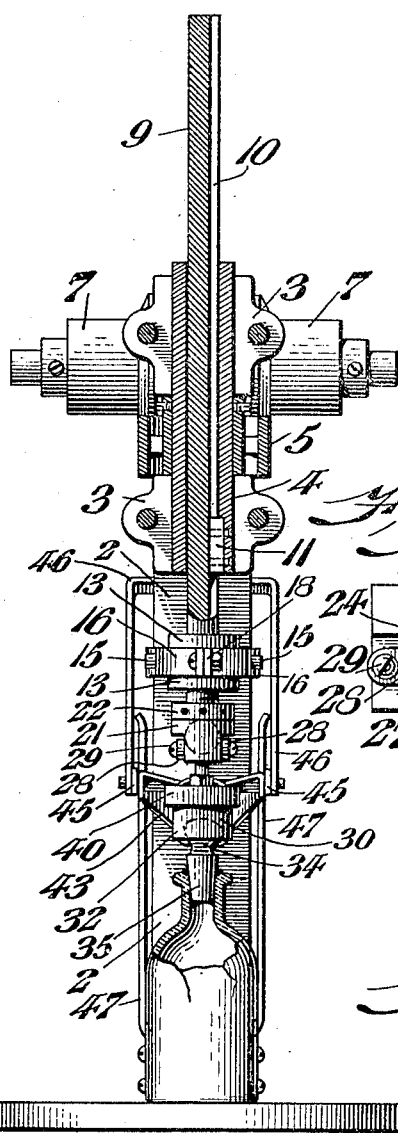
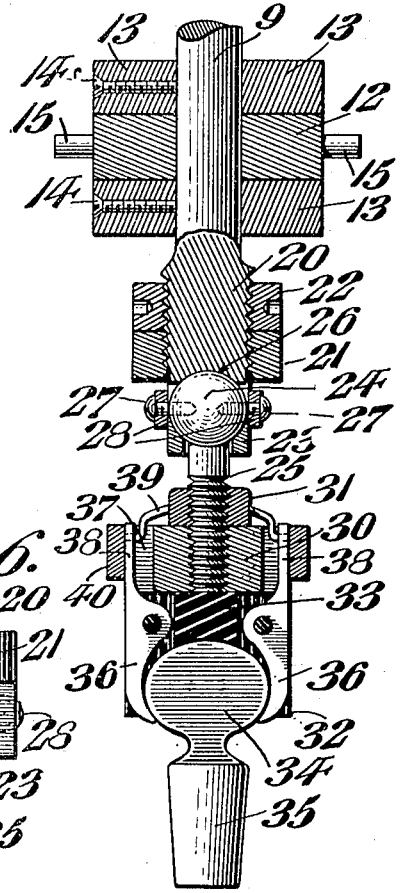
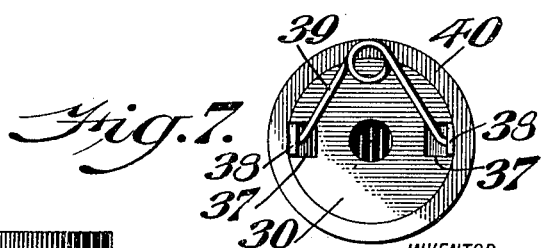
INVENTOR
Isaac L. Shoemaker
BY
ATTORNEYS

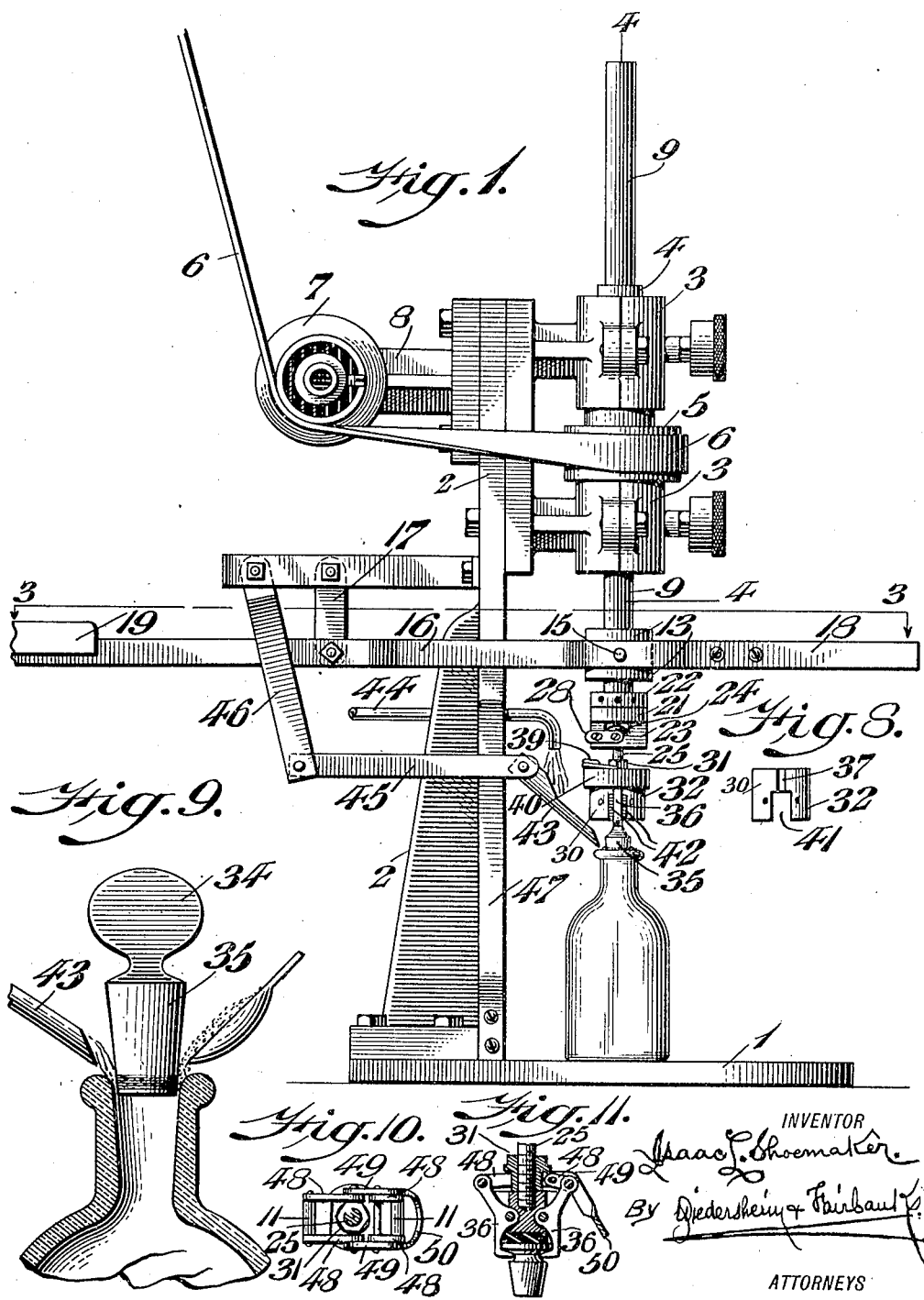

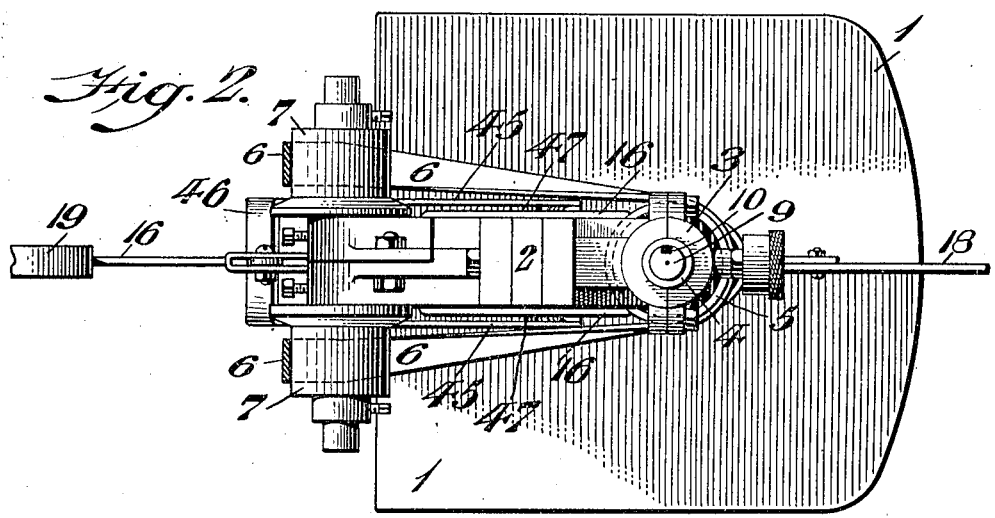
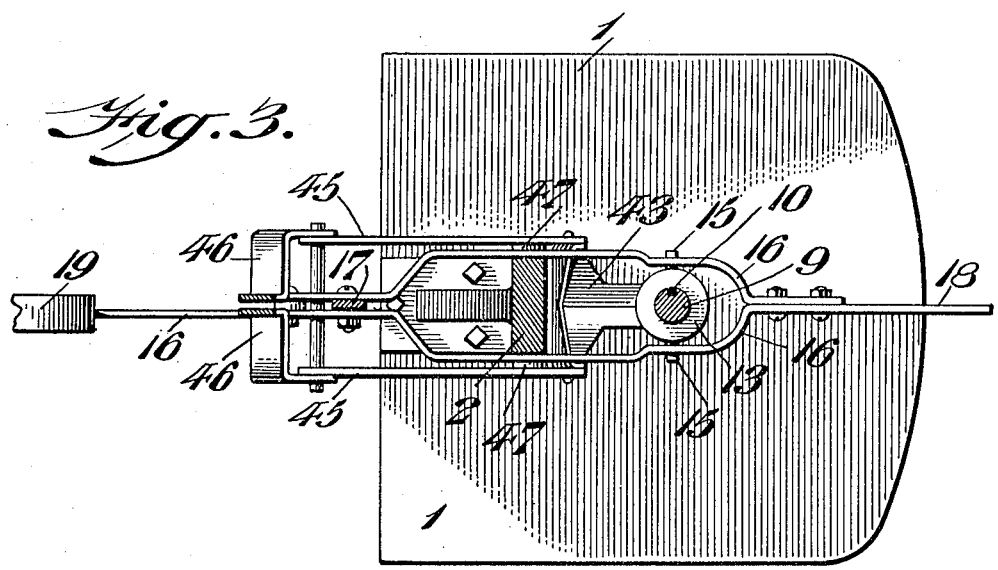

UNITED STATES PATENT OFFICE.

ISAAC L. SHOEMAKER, OF BRIDGETON, NEW JERSEY, ASSIGNOR TO THE CUMBERLAND GLASS MFG. CO., OF BRIDGETON, NEW JERSEY, A CORPORATION OF NEW JERSEY.

MACHINE FOR GRINDING GLASS STOPPERS.

1,298,261. Specification of Letters Patent. Patented Mar. 25, 1919.

Application filed April 22, 1918. Serial No. 229,963.

*To all whom it may concern:*

Be it known that I, ISAAC L. SHOEMAKER, a citizen of the United States, residing at Bridgeton, in the county of Cumberland, State of New Jersey, have invented a new and useful Machine for Grinding Glass Stoppers, of which the following is a specification.

My invention has for its object the grinding of a glass stopper for a bottle whereby it will properly fit the neck of the latter, and it consists of novel means for accomplishing the same, said mouth being utilized to receive grinding material and guide the stopper descendingly into the neck of the bottle as the grinding progresses, thus imparting a uniform surface to the stopper so that it accords freely with the inner wall of the neck of the bottle.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a stopper grinding machine embodying my invention.

Fig. 2 represents a top or plan view thereof.

Fig. 3 represents a horizontal section on line 3—3 Fig. 1.

Fig. 4 represents a partial vertical section on line 4—4 Fig. 1, and a partial end elevation.

Fig. 5 represents a vertical section of a detached portion on an enlarged scale.

Fig. 6 represents a side elevation of a detached portion on an enlarged scale showing a ball and socket joint and adjacent members employed in the machine.

Fig. 7 represents a top or plan view on an enlarged scale of the top members of the stopper-carrier and holder.

Fig. 8 represents a side elevation of the stopper carrier or chuck. Fig. 9 represents a diagrammatical view illustrating the grinding action on the stopper. Fig. 10 represents a partial transverse section, and partial plan view of another form of the stopper carrier or chuck. Fig. 11 represents a vertical section thereof on line 11—11 Fig. 10.

Similar numerals of reference indicate corresponding parts in the figures. Referring to the drawings:—

1 designates the base of the machine, and 2 designates a standard which rises therefrom. To the upper portion of said standard are secured the bosses 3 in which is freely fitted the rotatable sleeve 4 with whose exterior is connected by screw studs or other suitable means the pulley 5 which is adapted to be operated by the endless belt 6 which passes around the same and around the guide pulleys 7 which are mounted on the arm 8, the latter being attached to the upper portion of the standard 2 adjacent to the pulley 5, said belt receiving power from any suitable source, it being noticed that the pulley 5 is interposed between the bosses 3.

In the sleeve 4 is the main shaft 9 of the machine, said shaft having on it the key seat 10 which freely receives the spline 11 which is secured to the inner wall of said sleeve 4, as most plainly shown in Fig. 4, said spline and key seat forming a feathered connection for said sleeve and shaft, it being seen while the sleeve 4 receives rotation from the pulley 5 owing to the spline 11 and key seat 10, rotation is imparted to the shaft 9, and the latter is permitted also to have rising and lowering vertical motions imparted to it.

A lower portion of the shaft 9 is passed freely through the collar 12 which is retained in position thereon by the collars 13 which are secured to the shaft above and below the same by the screws 14. On opposite places of the collar are the gudgeons 15 on which are freely mounted the rising and lowering forked lever 16 whose axis is on the hanger 17 with which it is pivotally connected, said hanger being pivotally mounted on the arm 18 which projects from and is secured to adjacent portions of the standard 2.

One end 18 of the lever 16 comprises a handle for lowering the same, and the other end has thereon the weight 19 for the purpose of restoring said lever to its normal elevated position and with it the shaft 9, the object of which will be hereinafter further explained.

The lower portion 20 of the shaft 9 is threaded and enters and engages the interiorly threaded collar 21 which latter is held in position by the jam or lock nut 22 on said shaft.

Depending from the lower end of the shaft 9 is the socket 23 for the ball head 24 on the threaded-shaft-section 25 which thus is a downward continuity of the shaft 9, and rotatable and vertically movable therewith.

The head 24 is seated in and bears upwardly freely against the concave seat 26 in the lower end of the portion 20 of the shaft 9, see Fig. 5, said head being also pivotally held in the socket 23 by the screws 27 which are passed through straps 28 and the sides of the socket into said head, said straps being placed on the exterior of the socket and secured thereto by the screws 29, see Figs. 5 and 6, it being seen that the ball head is adapted to move in the socket to a limited extent to prevent subsequent strain on the bottle stopper while being ground, as will be hereinafter further explained.

The threaded portion of the shaft section 25 enters the head 30 of a chuck or carrier 32 which is held in place by the jam or lock nut 31 on the shaft-section 25. The body of said carrier is tubular to receive in it the head 34 of the stopper 35, as most plainly shown in Fig. 5, and contains the piece 33 of pliable or elastic material which is seated against the underside of the head 30 and adapted to have the stopper bear upwardly against the same providing a resilient cushion for the stopper during the grinding action on the same.

On said carrier 32 are mounted the jaws or grippers 36 which occupy the recesses 37, it being noticed that the nose portions of said jaws which are below are adapted to grip the head of the stopper and hold the latter during the grinding operation.

The shank or upper portions 38 of said jaws or grippers 36 which occupy the portions of the recesses 37 may be moved toward each other so that the nose portions of the jaws or grippers may be separated and thus release the stopper therefrom.

In order to hold the jaws closed on the head of the stopper there are connected with the shanks 38, the legs of the bent or other shaped spring 39, serving to force said shank outwardly, and the nose portions inwardly, as most plainly shown in Figs. 5 and 7.

On the exterior of the head 30 is tightly fitted the ring or band 40 which serves to limit the outward motions of the upper ends of the jaws 36.

The lower portions of the recesses 37 are cut away forming the offsets 41 on the side walls of which are seated the cushions 42 of pliable or resilient material, see Figs. 1 and 8, which are adapted to bear against the opposite flat sides of the head of the stopper and prevent undue pressure thereon and breakage of the same during the grinding action. Then owing to the ball and socket joint formed by the members 23 and 24 for the shaft section 25 with the main shaft 9, said section and parts connected therewith may rotate sufficiently when subjected to any rotatable strain caused by the rotating stopper during the grinding action of the machine, thus preventing what may be termed torsion on the head of the stopper and breakage of the same.

43 designates a spout for directing water from the pipe 44 to the mouth of the bottom where the stopper is primarily inserted, see Fig. 1, said spout being connected pivotally with the links 45 which are pivotally connected with the arm 18.

The links 45 are in frictional contact with springs 47 which are preferably of the form of plates of resilient material secured at the lower ends to the bottom of the standard 2, it being evident that the links 45 and 46 may be raised or lowered so as to adjust the position of the spout 43 to the mouth of the bottle about which the grinding of the stopper is occasioned, the links 45 remaining frictionally engaged with the springs 47 where they have been set.

The operation is as follows:—

The shaft 9 is raised by the handle 18 of the lever 16, thus raising the carrier 32 and its appurtenances. The jaws or grippers are then opened by the operator and the head of a stopper is placed in the carrier between the nose portions of the jaws or grippers, when the latter are let-go, when they close on the head of the stopper.

A bottle is then placed on the base 1 below the stopper when the handle 18 is lowered and with it the connected members whereby the lower end of the stopper is introduced into the mouth of the bottle, see Fig. 9. The water or fluid is turned on and a quantity of sand or gritty material is poured into the slightly existing space between the bottom portion of the stopper and the interior of the mouth of the bottle. Power is now applied to the sleeve 4 and consequently to the shaft 9 so as to rotate the same and by means of the intermediate mechanism to rotate the stopper - carrier, and with it the stopper held therein.

The operator lowers the handle 18 whereby the stopper is lowered into the mouth and consequently the neck of the bottle, the bottle being held on the base 1 by the hand of the operator.

It will here be noticed that primarily the body of the stopper is slightly of greater diameter than that of the interior of the neck portion of the bottle and as said body rotates in said mouth its exterior is subjected to the action of the sand or gritty material and the water introduced between said body and the interior of the mouth and neck portion of the bottle, and so the body is ground off to such extent that its diameter is reduced whereby the body will descend into said neck portion and fit easily in the latter, the entire length of said body, the surface thereof being also uniform and well finished producing a practical stopper as the closure of the bottle. The operator then raises the shaft 9 and with it the connected parts including the carrier 32 and with it the finished stopper withdrawing it from the bottle. The machine is stopped and the jaws or grippers are opened allowing the stopper to be removed from the same and the carrier. The bottle is also removed, after which the operations may be repeated. As stated, the shaft is adapted to be rotated by the sleeve 4 which is connected with the hub of the pulley 5. Then the spline is connected with the interior of said sleeve and it enters the key seat 10 of said shaft, all of which is most apparent in Fig. 4. Rotation is imparted by said pulley to said sleeve and spline and so to said shaft, while the latter is permitted to be lowered and raised in said sleeve, it being seen that the shaft is steadied in said sleeve as the latter acts as a bushing for the former and permits its rotation in the latter with reduced friction, sufficient however, to hold the shaft at a desired point, especially when lowered, sensitive to the operator of the machine, who has the lever 16 under his control and so can feel in the movement of said shaft when the stopper is ground to the required extent.

In Figs. 10 and 11 I show another form of a stopper chuck or carrier, in which the grippers 36 are pivotally connected at the top with the links 48 with which latter are pivotally connected elbow levers 49 whose outer terminals are joined by the cross bar 50 forming a handle for operating said levers, it being noticed that by pressing downwardly on said handle, the grippers are so operated on their upper portions as to force in the nose portions thereof against the stopper so as to take hold of the same, as best shown in said Fig. 11. Then by raising said handle, the upper portions of the grippers are brought together, thus drawing said nose portions from the stopper, whereby the latter is released of the chuck, and so may be removed therefrom.

The stopper shown in Fig. 11 is that known as round or mushroom, while that shown more particularly in Figs. 1, 4, 5 is one with a flat head, but to the form of the stopper to be chucked or carried, I do not limit myself.

Having thus described my invention what I claim as new and desire to secure by Letters Patent, is:—

1. In a machine for grinding a glass stopper, a shaft adapted to be lowered, means for rotating said shaft, a spout for delivering abrasive material to the stopper at the mouth of a bottle, a movable support for said spout, and means for operating said support whereby said spout may be set in adjusted position.

2. In a machine for grinding a glass stopper, a shaft adapted to be rotated, lowered and raised, said shaft being formed in sections, a ball and socket joint adapted to connect the sections, a stopper-carrier on the lower section, a spout for delivering abrasive material to the stopper at the mouth of a bottle, and means adapted to frictionally control said carrier whereby the spout may be held in adjusted position.

3. In a machine for grinding a glass stopper, a shaft adapted to be rotated and lowered and raised, a stopper-carrier composed of a member connected with said shaft, grippers adapted to engage the stopper, means on said member for closing said grippers on the stopper, and a resilient cushion on said member adapted to have the top of the head of the stopper bear against the same.

4. In a machine for grinding a glass stopper, a shaft adapted to be rotated and lowered and raised, a stopper-carrier composed of a member connected with said shaft, grippers adapted to engage the stopper, means on said member for closing said grippers on the stopper, and a resilient cushion on said member adapted to bear against the side of the head of the stopper.

5. In a machine for grinding a glass stopper, a stopper-carrier consisting of grippers adapted to engage the stopper, a member on which said grippers are mounted, a shaft adapted to be rotated, lowered and raised, said member being attached to said shaft, and a resilient device on said member adapted to engage said grippers to hold the same in closed position on the stopper, said member having in its side recesses in which the shanks of said grippers are adapted to play, and a band on said member adapted to freely encircle the shanks to control the closing motions of said grippers.

6. In a machine for grinding a glass stopper, a stopper-carrier, a rotatable bushing, the latter having bearings on the frame of the machine, means for operating said bushing, a driving shaft for said carrier in said bushing, means for raising and lowering said shaft, a feathered connection for said bushing and shaft, fixed collars, and an intermediate loose collar provided with gudgeons and through which collars said shaft passes.

7. In a machine for grinding a glass stopper, a resilient member on the frame of the machine, a supply spout adapted to direct a fluid to the mouth of a bottle, and to a stopper adapted to enter said mouth, and a rising and lowering support for said spout adapted to frictionally engage said resilient member.

8. In a machine for grinding a glass bottle stopper, a stopper carrier consisting of grippers, a member on which the latter are mounted, said member having therein recesses in which said grippers are movable in opposite directions, a resilient device on said member connectible with said grippers adapted to close the latter on the stopper, and a band encircling said member and the shanks of said grippers adapted to control the closing motions of the latter.

9. In a machine for grinding a glass stopper, a stopper carrying shaft adapted to be rotated, lowered and raised, said shaft being formed of sections one of which comprises a screw, a ball and a socket forming a joint adapted to connect the sections, said ball being connected with said screw, a strap on said socket connected therewith, and pivots for said ball extending from said strap freely into said ball.

10. In a machine for grinding a glass stopper, a stopper carrier, a driving shaft connected with said carrier adapted to be rotated, lowered and raised, said shaft being formed in sections, one section of which is of the form of a screw, ball and socket members forming a joint adapted to be connected with said sections, a strap on the socket member connectible with the same, a screw on said strap adapted to enter the ball member and form pivots therefor, and a nut-like device on said screw section of the driving shaft adapted to tighten against the head of the stopper carrier.

11. In a machine for grinding a glass stopper, a stopper-carrier, a driving shaft for said carrier, means adapted to rotate, lower and raise said shaft, a bushing on the frame of the machine through which said shaft passes, means for rotating said bushing, said shaft having a longitudinally extending key seat, a spline on the interior of said bushing received in said key seat, fixed collars through which said shaft passes, and an intermediate loose collar through which said shaft passes, said loose collar being provided with gudgeons freely mounted on said raising and lowering means.

12. In a machine for grinding a glass stopper, a driving shaft adapted to be rotated, lowered and raised, said shaft being formed in sections, a bushing on the frame of the machine adapted to support said shaft, a ball and socket joint adapted to connect said sections, a stopper-carrier on the lower section, a spout for delivering abrasive material to the stopper at the mouth of the bottle, and means adapted to frictionally control said spout whereby the latter may be held in adjusted position.

ISAAC L. SHOEMAKER.

Witnesses:
RAE B. LOPER,
HOWARD W. PIERSON.

Copies of this patent may be obtained for five cents each, by addressing the "Commissioner of Patents, Washington, D. C."